UNITED STATES PATENT OFFICE.

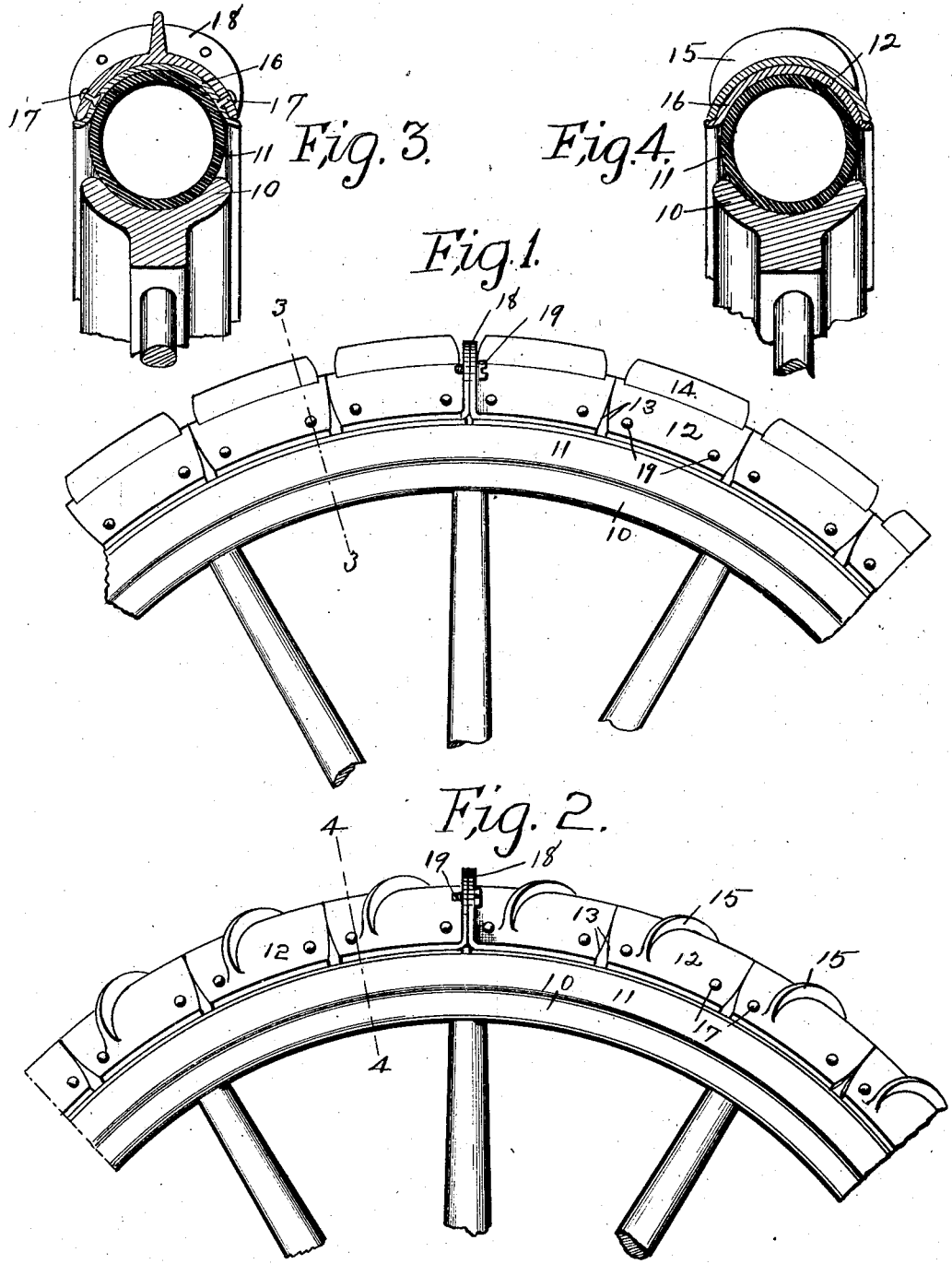

FRED W. KRUGER, OF LITTLE CEDAR, IOWA.

SHIELD FOR PNEUMATIC TIRES.

No. 928,986.　　　Specification of Letters Patent.　　Patented July 27, 1909.

Application filed April 18, 1907. Serial No. 368,824.

*To all whom it may concern:*

Be it known that I, FRED W. KRUGER, a citizen of the United States, residing at Little Cedar, in the county of Mitchell and State of Iowa, have invented a certain new and useful Shield for Pneumatic Tires, of which the following is a specification.

The object of my invention is to provide a shield especially adapted for use in connection with pneumatic tires for automobiles, and heavy vehicles, and designed to prevent lateral slipping of the steering wheels over slippery surfaces, and to give driving power to the traction wheels under similar conditions.

A further object is to provide a shield of this kind that may be quickly and easily attached to, or detached from a pneumatic tire, and when in position will prevent slipping as before stated, and also will not interfere with the flexibility of a pneumatic tire so that the impact of the tire passing over uneven road surfaces will not be imparted to the vehicle, and further to provide a device of this kind in which the plate bearing the ribs will not wear out the pneumatic tire.

My invention consists in the construction, arrangement and combination of the various parts of the outer armor, whereby the objects contemplated are attained, as hereinafter more fully set forth, pointed out in my claim, and illustrated in the accompanying drawings, in which—

Figure 1 shows a side elevation of a part of the vehicle wheel with the pneumatic tire thereon, and a portion of an armor embodying my invention, showing the form thereof adapted for use on the steering wheels. Fig. 2 shows a similar view showing the form of armor adapted for use on the propelling traction wheels. Fig. 3 shows a sectional view on the line 3—3 of Fig. 1, and—Fig. 4 shows a sectional view of the line 4—4 of Fig. 2.

Referring to the accompanying drawings, I have used the reference numeral 10 to indicate the portion of the wheel felly shown, 11 indicates the pneumatic tire of ordinary construction, fitted to the felly. These parts are of the ordinary construction, and form no part of my invention.

My improved armor comprises a series of metallic plates 12, each of segmental form to fit the contour of the periphery of a pneumatic tire, and also segmental in cross section to fit the transverse contour of a pneumatic tire. These plates have their adjacent edges slightly rounded at the corners, at the points marked 13, for purposes hereinafter made clear. The plates 12 that are designed for use on steering wheels, are each provided with a longitudinally arranged rib 14, and the plates designed for use on propelling or traction wheels are provided with ribs 15, that extend diagonally across the plates.

For forming each tire armor, I assemble a sufficient number of the plates 12, upon a flexible, non-elastic protecting strip 16, which may if desired, be made of belting or similar material, and which is shaped to extend around the periphery of the tire, and to fit the transverse curvature thereof, as clearly shown in Figs. 3 and 4. The edges of this protecting strip project a slight distance beyond the edges of the plates 12, and each plate is connected with the protecting strip 16 by means of the rivets 17, at the corners of the plates. Two of the plates 12 are provided with outwardly projecting flanges 18, extended transversely, and these flanges are adjustably and detachably connected by the bolts 19.

In practical use, the armor may be attached to the pneumatic tire by placing it around the periphery thereof, and then inserting and tightening the bolts 19, or if the armor cannot be firmly secured in this way, the pneumatic tire may be slightly deflated before the armor is applied, and then after the armor is fitted in position, the tire may be inflated, and thus the armor will be firmly held thereto. The metallic protecting plates 12 are connected with a flexible and non-elastic strip 16 in such a way that when said plates come in contact with uneven road surfaces they may yield, and thus cushion the wheel. In order however, to permit such yielding movement of the plates, it is necessary that the adjacent edges be curved at the corners, as clearly shown, so that the plates may have a slight rocking movement relative to each other. By this means, the elasticity of the pneumatic tire is preserved to as great an extent as is possible. The object of having the flexible shield 16 project beyond the edges of the plates 12, is that when there is such impact upon the plates 12 as to depress them, and also the pneumatic tire, the sides of the pneumatic tire will not be brought in direct contact with the side edges of the plates 12, but will be protected from such contact by the edges of the shields 16, which project beyond the plates 12. Furthermore, by having a flexible non-elastic shield 16 placed in direct contact with the pneumatic tire, I have avoided as much as possible the entrance of dust or mud between the pneumatic tire and the shield. It is impossible to prevent the entrance of dust and mud between the plates 12, when they are allowed the necessary movement with relation to each other. However, by providing the shield 16 the surface between the shield and the pneumatic tire may be kept clean.

Having thus described my invention, what I claim and desire to secure by Letters Patent of the United States therefore, is—

A shield for pneumatic tires, comprising a flexible non-elastic shield shaped to pass around the periphery of a tire and to fit the transverse contour thereof, a series of metallic plates disconnected from each other and each being shaped to fit a contour of a segment of a pneumatic tire and being also shaped to fit the transverse contour of a pneumatic tire, said metal plates being connected to the shield by means of rivets passed through the corners thereof, and said plates disconnected from each other to permit independent movements of the plates, the side edges of said shield being extended beyond the side edges of the plates and the end edges of the plates being curved or rounded as set forth, said plates being also provided with ribs projecting outwardly therefrom, and means for connecting the two end plates of the shield with each other.

Des Moines, Iowa, 3/29/07.

FRED W. KRUGER.

Witnesses:
CHARLES E. SALISBURY,
C. LARSON.